US012803166B2

(12) United States Patent
Lu

(10) Patent No.: US 12,803,166 B2
(45) Date of Patent: Nov. 17, 2026

(54) RADIATING ELEMENT AND BASE STATION ANTENNA

(71) Applicant: Outdoor Wireless Networks LLC, Claremont, NC (US)

(72) Inventor: Jianpeng Lu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 167 days.

(21) Appl. No.: 18/861,946

(22) PCT Filed: Apr. 28, 2023

(86) PCT No.: PCT/US2023/020302
§ 371 (c)(1),
(2) Date: Oct. 31, 2024

(87) PCT Pub. No.: WO2023/224783
PCT Pub. Date: Nov. 23, 2023

(65) Prior Publication Data

US 2026/0254116 A1 Aug. 27, 2026

(30) Foreign Application Priority Data

May 19, 2022 (CN) ......................... 202210552237.5

(51) Int. Cl.
*H01Q 5/30* (2015.01)
*H01Q 1/24* (2006.01)
(Continued)

(52) U.S. Cl.
CPC ............... *H01Q 5/30* (2015.01); *H01Q 1/246* (2013.01); *H01Q 5/20* (2015.01); *H01Q 19/10* (2013.01)

(58) Field of Classification Search
CPC ............ H01Q 1/246; H01Q 5/20; H01Q 5/30; H01Q 19/10
See application file for complete search history.

(56) References Cited

U.S. PATENT DOCUMENTS 6,208,316 B1 3/2001 Cahill
2003/0164803 A1 9/2003 Wu
(Continued)

FOREIGN PATENT DOCUMENTS

CN 203983504 U * 12/2014 ............. H01Q 19/10
EP 3886250 A1 9/2021
(Continued)

OTHER PUBLICATIONS

"Extended European Search Report dated Apr. 20, 2026, issued in corresponding European Application No. 23808063.4, 8 pages".
(Continued)

*Primary Examiner* — Hoang V Nguyen
(74) *Attorney, Agent, or Firm* — Myers Bigel, P.A.

(57) ABSTRACT

A radiating element is provided, comprising: a radiator, configured to emit a first electromagnetic radiation within a first operating frequency band; and a frequency selective director having a sub wavelength periodic structure mounted adjacent the radiator, the frequency selective director configured to adjust a radiation pattern of the first electromagnetic radiation within a first sub-band of the first operating frequency band while substantially not adjusting a radiation pattern of the first electromagnetic radiation within a second sub-band of the first operating frequency band.

19 Claims, 12 Drawing Sheets

(51) Int. Cl.
*H01Q 5/20* (2015.01)
*H01Q 19/10* (2006.01)

(56) References Cited

U.S. PATENT DOCUMENTS

2012/0146872 A1 6/2012 Chainon et al.
2021/0296785 A1 9/2021 Zimmerman et al.

FOREIGN PATENT DOCUMENTS

WO WO-2020162818 A1 * 8/2020 ............... H01Q 9/28
WO 2021222217 A1 11/2021

OTHER PUBLICATIONS

"International Search Report and Written Opinion of the International Searching Authority", International Application No. PCT/US2023/020302, Jul. 21, 2023, 12 pp.

* cited by examiner

RADIATING ELEMENT AND BASE STATION ANTENNA

CROSS-REFERENCE TO RELATED APPLICATIONS

The present application is a 35 U.S.C. § 371 national stage application of PCT Application No. PCT/US2023/020302, filed on Apr. 28, 2023, which itself claims priority to Chinese Patent Application No. 202210552237.5, filed May 19, 2022, the entire contents of both of which are incorporated herein by reference as if set forth fully herein.

FIELD

The present disclosure relates to a communications system, and more particularly, to a radiating element and a base station antenna.

BACKGROUND

Cellular communications systems are well known in the art. In a cellular communications system, a geographic area is divided into a series of sections that are referred to as "cells" which are served by respective base stations. The base station may include one or more base station antennas that are configured to provide two-way radio frequency ("RF") communications with mobile subscribers that are within the cell served by the base station.

In many cases, each base station is divided into "sectors". In perhaps the most common configuration, a small hexagonally shaped cell is divided into three 120° sectors, and each sector is served by one or more base station antennas that produce a radiation pattern or an "antenna beam" with an azimuth half power beam width (HPBW) of approximately 65°. Typically, the base station antennas are mounted on a tower structure, with the antenna beams that are generated by the base station antennas directed outwardly. Base station antennas are often realized as linear or planar phased arrays of radiating elements.

In order to accommodate the ever-increasing volumes of cellular communications, cellular operators have added cellular services in a variety of new frequency bands. While in some cases it is possible to use linear arrays of so-called "wideband" or "ultra-wideband" radiating elements to provide service in multiple frequency bands, in other cases it is necessary to use different linear arrays or planar arrays of radiating elements to support service in the different frequency bands.

As the number of frequency bands has proliferated, increased sectorization has become more common (e.g., dividing a cell into six, nine or even twelve sectors), and the number of base station antennas deployed at a typical base station has increased significantly. However, due to local zoning ordinances and/or weight and wind loading constraints for the antenna towers, etc. there is often a limit as to the number of base station antennas that can be deployed at a given base station. In order to increase capacity without further increasing the number of base station antennas, so-called multi-band antennas have been introduced in which multiple arrays of radiating elements are included in a single antenna. One common multi-band antenna includes multiple linear array of "mid-band" radiating elements that are used to provide service in some or all of the 1427-2690 MHz frequency band, and multiple linear arrays of "high-band" radiating elements are provided that are used to provide service in some or all of the 3100-5800 MHz frequency band.

To achieve such multi-band antennas in a commercially acceptable manner, the directivity and/or gain of the radiation pattern of the mid-band and/or high-band radiating elements within their respective operating frequency bands should meet predetermined requirements. In some cases, the directivity and/or the gain of the radiation pattern of the mid-band and/or high-band radiating elements within their respective operating frequency bands should be stabilized as much as possible. In other words, it is desirable that the gain be relatively constant as a function of frequency.

In addition, to implement this type of multi-band antenna in a commercially acceptable manner, the undesired parasitic coupling that may occur in the multi-band antenna should be reduced as much as possible. These parasitic couplings may occur between arrays of radiating elements in different frequency bands. These parasitic couplings may cause distortion of the radiation pattern, such as a reduction in the front-to-back ratio and an increase in HPBW, particularly the azimuth HPBW.

SUMMARY

According to a first aspect of the present disclosure, a radiating element is provided, comprising: a radiator, configured to emit a first electromagnetic radiation within a first operating frequency band; and a metamaterial director mounted in front of the radiator, wherein the metamaterial director is configured to adjust a radiation pattern of the first electromagnetic radiation.

According to a second aspect of the present disclosure, a radiating element is provided, comprising: a radiator, configured to emit a first electromagnetic radiation within a first operating frequency band; and a frequency selective director having a sub wavelength periodic structure mounted adjacent the radiator, the frequency selective director configured to adjust a radiation pattern of the first electromagnetic radiation within a first sub-band of the first operating frequency band while substantially not adjusting a radiation pattern of the first electromagnetic radiation within a second sub-band of the first operating frequency band.

In some embodiments, the frequency selective director narrowed the average azimuth beam width by at least 2, 3, 4, 5, 6, 7, 8, 9, 10 degrees in the first sub-band while narrowing the average azimuth beam width by less than 5, 4, 3, 2 degrees or 1 degree in the second sub-band.

According to a second aspect of the present disclosure, a base station antenna is provided, comprising: a reflecting plate; and a column of first radiating elements mounted in front of the reflecting plate, configured to operate within the first operating frequency band, wherein at least a portion of the first radiating elements in the column of first radiating elements are each configured as the radiating element according to present disclosure.

Through the following detailed description of exemplary embodiments of the present disclosure by referencing the attached drawings, other features and advantages of the present disclosure will become clear.

Figure 1:
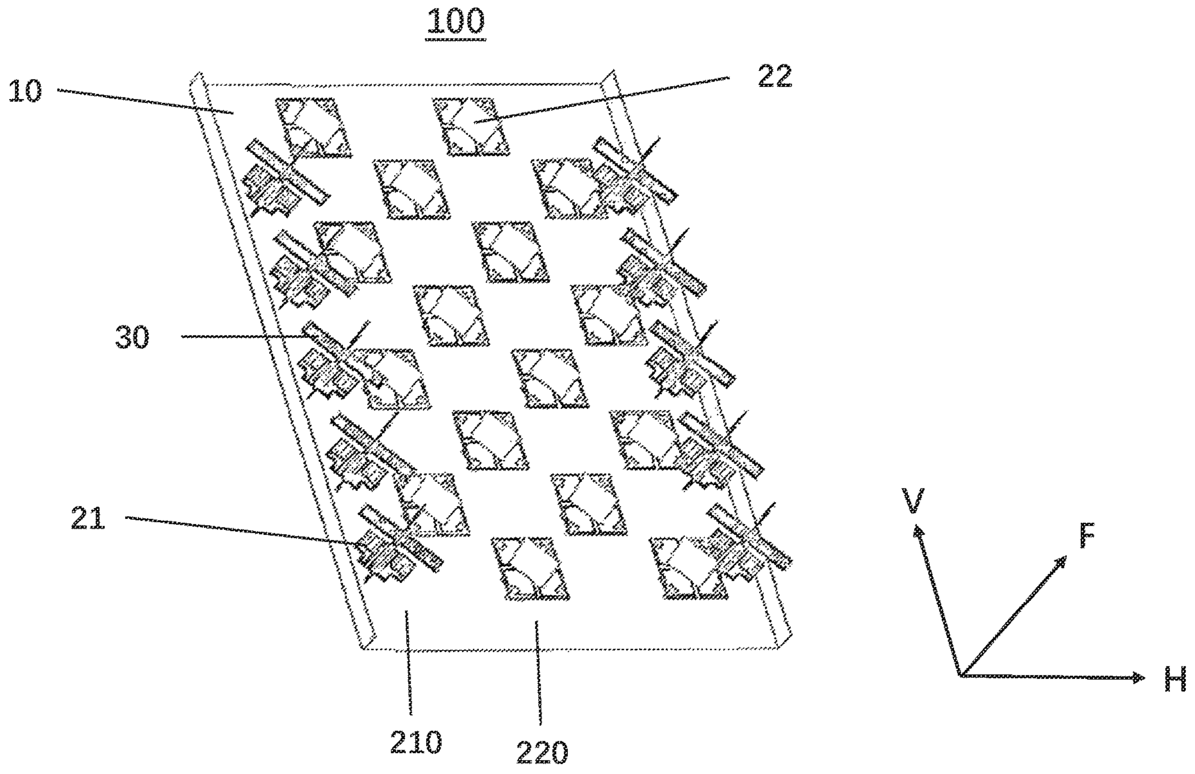
FIG. 1 is a schematic simplified perspective view of a base station antenna according to some embodiments of the present disclosure, in which, the radome is removed.

Note that in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like sometimes may not indicate the actual position, dimension, and range. Therefore, the present disclosure is not limited to the positions, dimensions, and ranges disclosed in the attached drawings and the like.

DETAILED DESCRIPTION

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific embodiments, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this specification, elements, nodes or features that are "connected" together may be mentioned. Unless explicitly stated otherwise, "connected" means that one element/node/feature can be mechanically, electrically, logically or otherwise connected with another element/node/feature in a direct or indirect manner to allow interaction, even though the two features may not be directly connected. That is, "connected" means direct and indirect connection of components or other features, including connection using one or more intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features. The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied. Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors. The word "basically" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or more other features, steps, operations, units and/or components and/or combinations thereof.

The present disclosure relates to a radiating element that includes a radiator and a metamaterial director mounted in front of the radiator, through which the radiation pattern of the radiating element, for example, its azimuth width and/or elevation width, can be effectively adjusted. The term "metamaterial" refers to an artificially synthesized electromagnetic material, which may include sub-wavelength periodic microstructures.

The metamaterial director of the present disclosure can operate as a "metamaterial lens" and has a tuning effect on an electromagnetic radiation incident on the metamaterial lens. In some embodiments, the metamaterial director of the present disclosure may be configured as a "metamaterial lens" to form a narrowing effect on an electromagnetic radiation incident on the metamaterial lens, effectively narrowing the azimuth width and/or the elevation width of the radiation pattern. In other embodiments, the metamaterial director of the present disclosure may be configured as a "metamaterial lens" to form a scattering effect on an electromagnetic radiation incident on the metamaterial lens, effectively widening the azimuth width and/or the elevation width of the radiation pattern.

The present disclosure also relates to a base station antenna that includes arrays of the above-mentioned radiating elements that are integrated with associated metamaterial directors. Parameters of the radiation pattern generated by the array of radiating elements, such as its azimuth width and/or elevation width, may be effectively adjusted by the metamaterial directors of the radiating elements.

Various aspects of the present disclosure are now described in detail with reference to the accompanying drawings.

Figure 2:
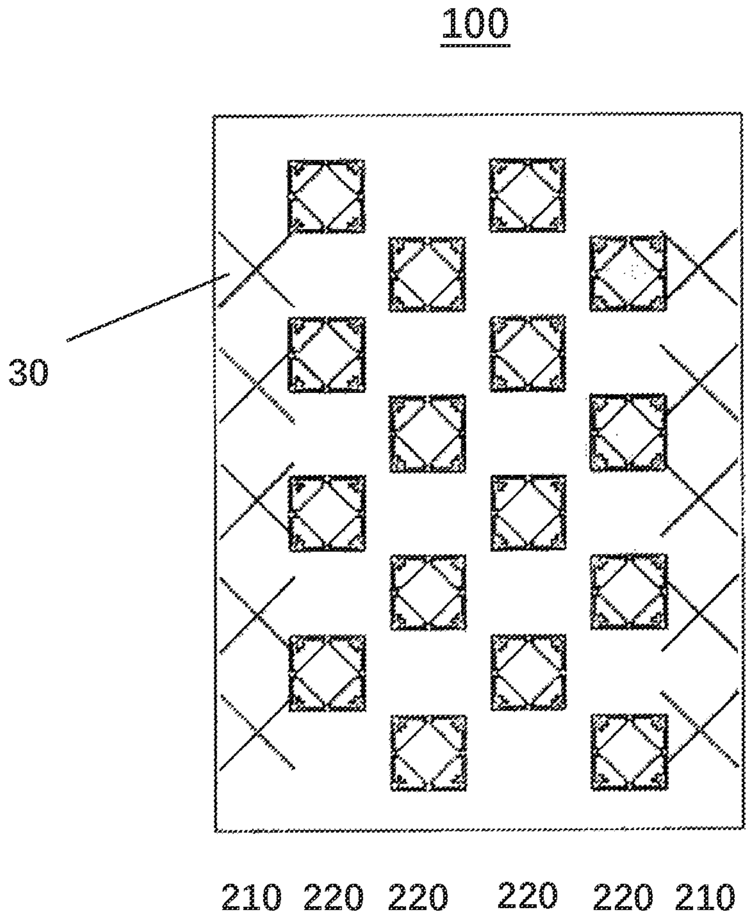
FIG. 2 is a schematic front view of the base station antenna in FIG. 1.
Figure 3:
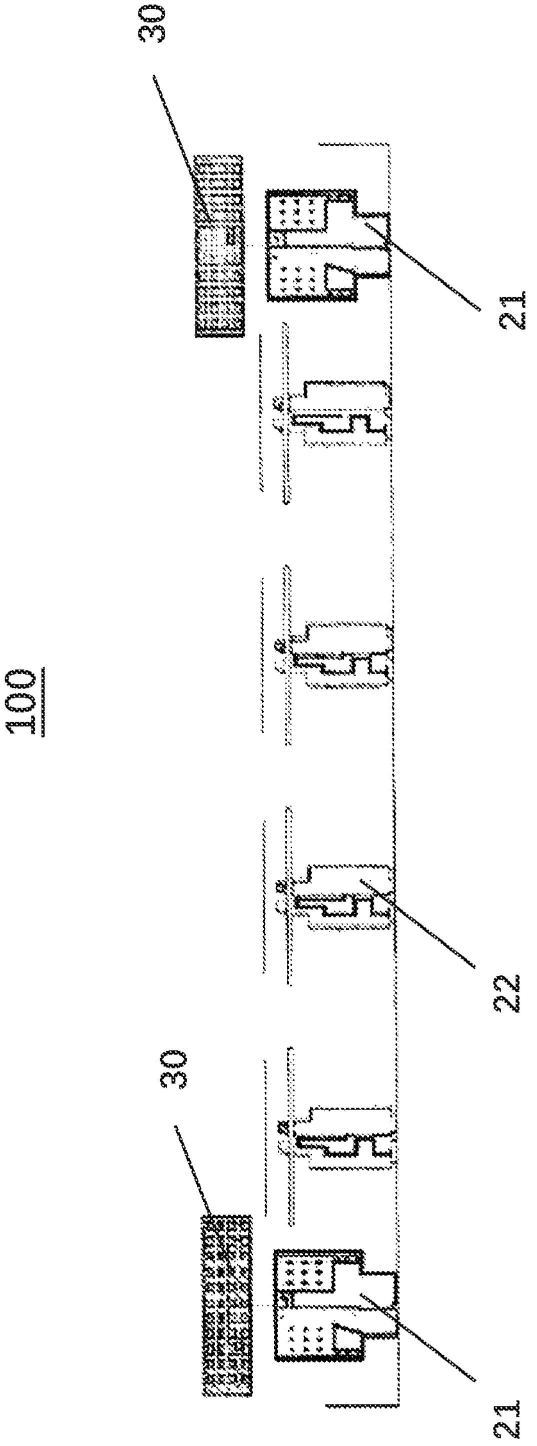
FIG. 3 is a schematic end view of the base station antenna in FIG. 1.

FIG. 1 is a schematic simplified perspective view of a base station antenna 100 according to some embodiments disclosed, in which, the radome is removed. FIG. 2 is a schematic front view of the base station antenna 100 of FIG. 1. FIG. 3 is a schematic end view of the base station antenna 100 of FIG. 1. It should be noted that the actual base station antenna 100 may also have other components, and in order to avoid obscuring the main points of the present disclosure, the other components are not shown in the accompanying drawings and will not be discussed herein.

As shown in FIGS. 1 to 3, the base station antenna 100 may include a column 210 of first radiating elements 21 and a column 220 of second radiating elements 22 mounted on a base surface of a reflecting plate 10. The column 210 of first radiating elements 21 may include multiple first radiating elements 21 arranged in the longitudinal direction V, and configured to operate in a first operating frequency band. The column 220 of second radiating elements 22 may include multiple second radiating elements 22 arranged in the longitudinal direction V and configured to operate in a second operating frequency band. The longitudinal direction V may be the direction of the longitudinal axis of the base station antenna 100 or may be parallel to the longitudinal axis. The longitudinal direction Vis perpendicular to the horizontal direction H and the forward direction F (see FIG. 1). Each radiating element 21, 22 is mounted to extend forwardly (along the forward direction F) from the reflecting plate 10. The reflecting plate 10 may serve as the ground plane structure for the radiating elements 21 and 22.

In some embodiments, the base station antenna 100 may be configured as a multi-band antenna. The first radiating elements 21 may be, for example, high-band radiating elements, and may each have an operating frequency band in at least a portion of the 3500-5000 MHz frequency band. The second radiating elements 22 may be, for example, mid-band radiating elements, and may each have an operating frequency band in at least a portion of the 1427-2690 MHz frequency band. It should be understood that the first radiating elements 21 and/or the second radiating elements 22 may also be configured as a radiating elements that can operate in other frequency bands. This is not limited in the current embodiment. Additionally or alternatively, the multi-band antenna may further include one or more arrays of low-band radiating elements, whose operating frequency band may be at least a portion of the 617-960 MHz frequency band.

As shown in FIGS. 1 to 3, each first radiating element 21 may be provided with a corresponding metamaterial director 30. The metamaterial director 30 (which has a main surface of a metal pattern) may extend forwardly, for example substantially perpendicularly, to the reflecting plate 10. The metamaterial directors 30 may be configured to adjust the azimuth width and/or the elevation width of the radiation pattern of the respective first radiating elements 21. In other words, the column 210 of first radiating elements 21 may be provided with a corresponding column of metamaterial directors 30, which may be configured to adjust the azimuth width and/or the elevation width of the radiation pattern generated by the column 210 of first radiating elements 21. In some cases, the column of metamaterial directors 30 may be configured to stabilize the azimuth width and/or the elevation width of the radiation pattern within the operating frequency band of the first radiating element 21 within a predetermined range.

Additionally or alternatively, although not shown in the figures, the column 220 of second radiating elements 22 may be provided with a corresponding column of metamaterial directors, which may be configured to adjust the azimuth width and/or the elevation width of the radiation pattern generated by the column 220 of second radiating elements. In some cases, the column of metamaterial directors may be configured to stabilize the azimuth width and/or the elevation width of the radiation pattern within the operating frequency band of the second radiating elements 22 within a predetermined range.

It should be understood that the number and/or arrangement of radiating elements (first and/or second radiating elements 21, 22) integrated with the metamaterial director 30 may be flexible. In some embodiments, all of the radiating elements in a column of radiating elements may be provided with corresponding metamaterial directors 30. In other embodiments, only some radiating elements in the column of radiating elements may be provided with corresponding metamaterial directors 30. In some embodiments, the corresponding metamaterial director 30 may also be removed at these interference positions when the metamaterial director 30 interferes with other functional devices within the base station antenna 100, such as the radome, parasitic elements, and/or mechanical support structures. In some embodiments, a corresponding metamaterial director 30 may also be provided only for those radiating elements (typically those radiating elements in the middle region of the column) that are assigned a higher radio frequency signal sub-component in the column of radiating elements.

It should be understood that the metamaterial director 30 may be a frequency-selective device. That is, the metamaterial director 30 may have different tuning effects for different operating frequency bands or sub-bands thereof. In some embodiments, the metamaterial director 30 may have different degrees of beam narrowing effects or refractive indexes for different operating frequency bands or sub-bands thereof. In some embodiments, the metamaterial director 30 may have different degrees of beam widening effects for different operating frequency bands or sub-bands thereof. In some embodiments, the metamaterial director 30 may have a beam narrowing effect for one frequency band while a beam widening effect for another frequency band.

In some cases, because the azimuth width of the radiation pattern generated by each first radiating elements 21 within a first sub-band of its operating frequency band exceeds a predetermined range, the directivity and/or gain of the first radiating element 21 within the first sub-band cannot meet predetermined requirements. To improve the directivity and/or gain of the first radiating element 21 within the first sub-band, the metamaterial director 30 may be configured to narrow the azimuth width of the radiation pattern of the first radiating element 21 within the first sub-band for improving the directivity and/or gain.

In some embodiments, the metamaterial director 30 may be configured to make the narrowing effect for an electromagnetic radiation within the first sub-band (e.g., at least a portion of 4.5-5 GHz) stronger than the narrowing effect for an electromagnetic radiation within the second sub-band (e.g., at least a portion of 3.5-4.5 GHz). In some embodiments, the metamaterial director 30 may be configured to have a narrowing effect only for the electromagnetic radiation within the first sub-band, while substantially have no narrowing effect for the electromagnetic radiation within the second sub-band.

It should be understood that the tuning effect, for example the narrowing effect, of each metamaterial director 30 in the column of metamaterial directors may be flexible. That is, the tuning effect of the metamaterial directors 30 assigned to the various radiating elements may be the same or different. In some embodiments, the column of radiating elements may be provided with a column of metamaterial directors with substantially the same tuning effect. In some embodiments, the column of radiating elements may be provided with a column of metamaterial directors having different tuning effects.

In some embodiments, one or more radiating elements in the column of radiating elements may be provided with a metamaterial director 30 having a first tuning effect, respectively, and one or more other radiating elements in the column of radiating elements may be provided with a metamaterial director 30 having a second tuning effect, respectively. In some embodiments, the narrowing effect of the metamaterial director 30 in the column of metamaterial directors may be decremented, by stage or continuously, from the end side to the middle along the longitudinal direction V. In other words, the refractive indexes of the metamaterial directors 30 for electromagnetic radiations within the operating frequency bands of the radiating elements or their sub-bands may be decremented, by stage or continuously, from the end side to the middle along the longitudinal V direction. Thus, the metamaterial directors 30 may have a greater effect on the radiation emitted by the radiating elements in the middle of a column than they have on the radiation emitted by the radiating elements at the open and lower ends of the column, in some embodiments.

Referring next to FIGS. 4 to 7B, a first radiating element 21 integrated with the metamaterial director 30 according to some embodiments of the present disclosure is described in detail.

Figure 4:
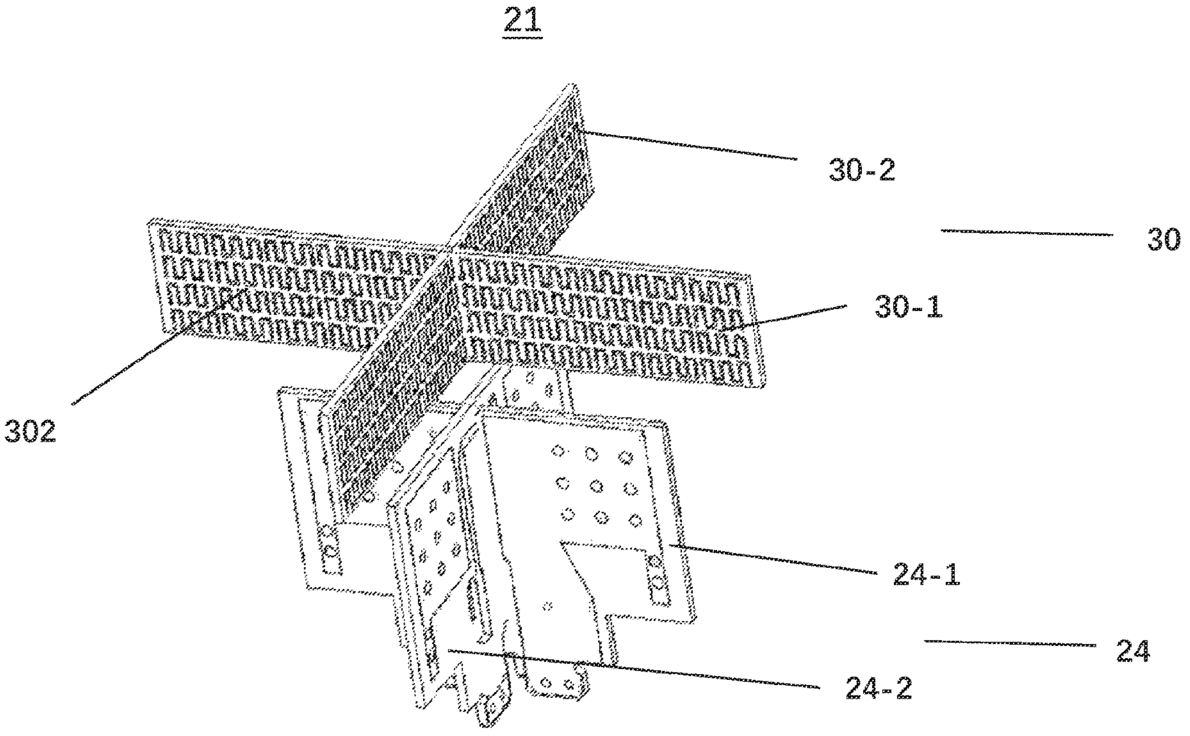
FIG. 4 is a schematic simplified perspective view of a radiating element according to some embodiments of the present disclosure.
Figure 6A:
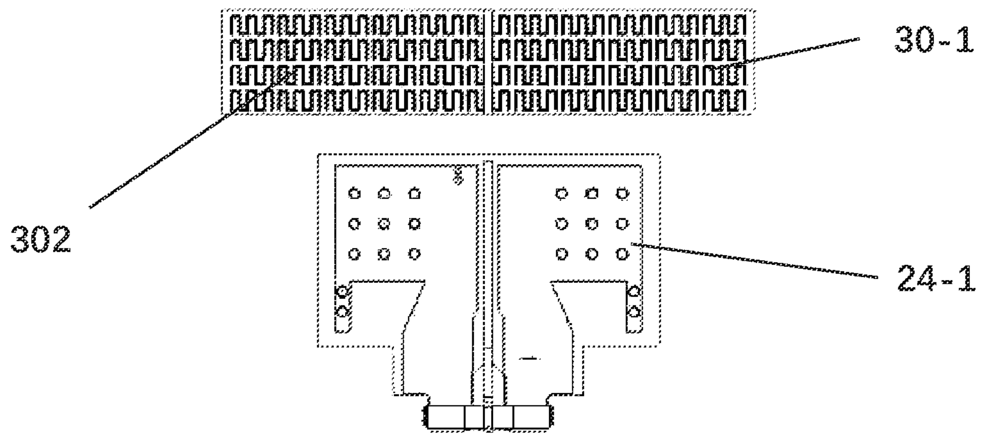
FIG. 6A is a schematic diagram of a first radiator of the radiating element in FIG. 4 together with a first metamaterial director for the first radiator.
Figure 6B:
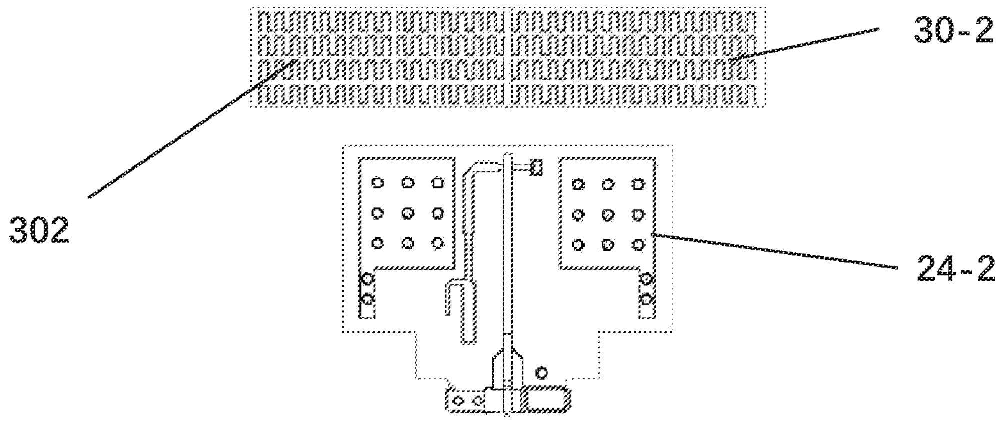
FIG. 6B is a schematic diagram of a second radiator of the radiating element in FIG. 4 together with a second metamaterial director for the second radiator.

FIG. 4 is a schematic simplified perspective view of a first radiating element 21 according to some embodiments of the present disclosure. FIG. 6A is a schematic diagram of a first radiator 24-1 of the radiating element in FIG. 4 along with a first metamaterial director 30-1 for the first radiator 24-1. FIG. 6B is a schematic diagram of a second radiator 24-2 of the radiating element in FIG. 4 along with a second metamaterial director 30-2 for the second radiator 24-2.

The first radiating element 21 may include a radiator 24 and a metamaterial director 30 mounted in front of the radiator 24. A main surface of the metamaterial director 30 having a metal pattern may extend forwardly from a side close to the radiator 24 generally extending perpendicular to the reflecting plate 10.

As shown in FIGS. 4, 6A, and 6B, the radiator 24 may include a first radiator 24-1 for a first polarized radio frequency signal and a second radiator 24-2 for a second polarized radio frequency signal. The metamaterial director 30 may include a first metamaterial director 30-1 for the first radiator 24-1 and a second metamaterial director 30-2 for the second radiator 24-2. The first metamaterial director 30-1 is configured to adjust, for example, narrow the azimuth width and/or the elevation width of the radiation pattern of the first radiator 24-1, and the second metamaterial director 30-2 is configured to adjust, for example, the azimuth width and/or the elevation width of the radiation pattern of the second radiator 24-2.

The first radiator 24-1 and the second radiator 24-2 may be crossed into a cross radiator 24, and the first metamaterial director 30-1 and the second metamaterial director 30-2 may be crossed into a cross metamaterial director 30. The first metamaterial director 30-1 and the second metamaterial director 30-2 may be cross-arranged with each other in any feasible engagement manner. In some embodiments, the first metamaterial director 30-1 may have a first engagement slot (not shown), the second metamaterial director 30-2 may have a second engagement slot (not shown), and the first and second metamaterial directors 30-2 may be cross-engaged with each other via the first and second engagement slots. Additionally or alternatively, the first and second metamaterial directors 30-2 may be cross-engaged with one another by welding.

To maintain a good tuning effect, the first radiator 24-1 may substantially overlap the first metamaterial director 30-1 in the forward direction F, and the second radiator 24-2 may substantially overlap the second metamaterial director 30-2 in the forward direction F. Thus, a first cross pattern formed by the first radiator 24-1 and the second radiator 24-2 may substantially overlap in the forward direction with a second cross pattern formed by the first metamaterial director 30-1 and the second metamaterial director 30-2. "Substantially overlapping in the forward direction" may be understood as follows: Projections of the radiator 24 and the corresponding metamaterial director 30 on the reflecting plate 10 overlap one another. In some embodiments, the projection of the corresponding metamaterial director 30 on the reflecting plate 10 may be aligned with the projection of the radiator 24 on the reflecting plate 10. In some embodiments, the projection of the corresponding metamaterial director 30 on the reflecting plate 10 may fall within the projection of the radiator 24 on the reflecting plate 10. In some embodiments, the projection of the radiator 24 on the reflecting plate 10 may fall into the projection of the corresponding metamaterial director 30 on the reflecting plate 10.

Figure 5:
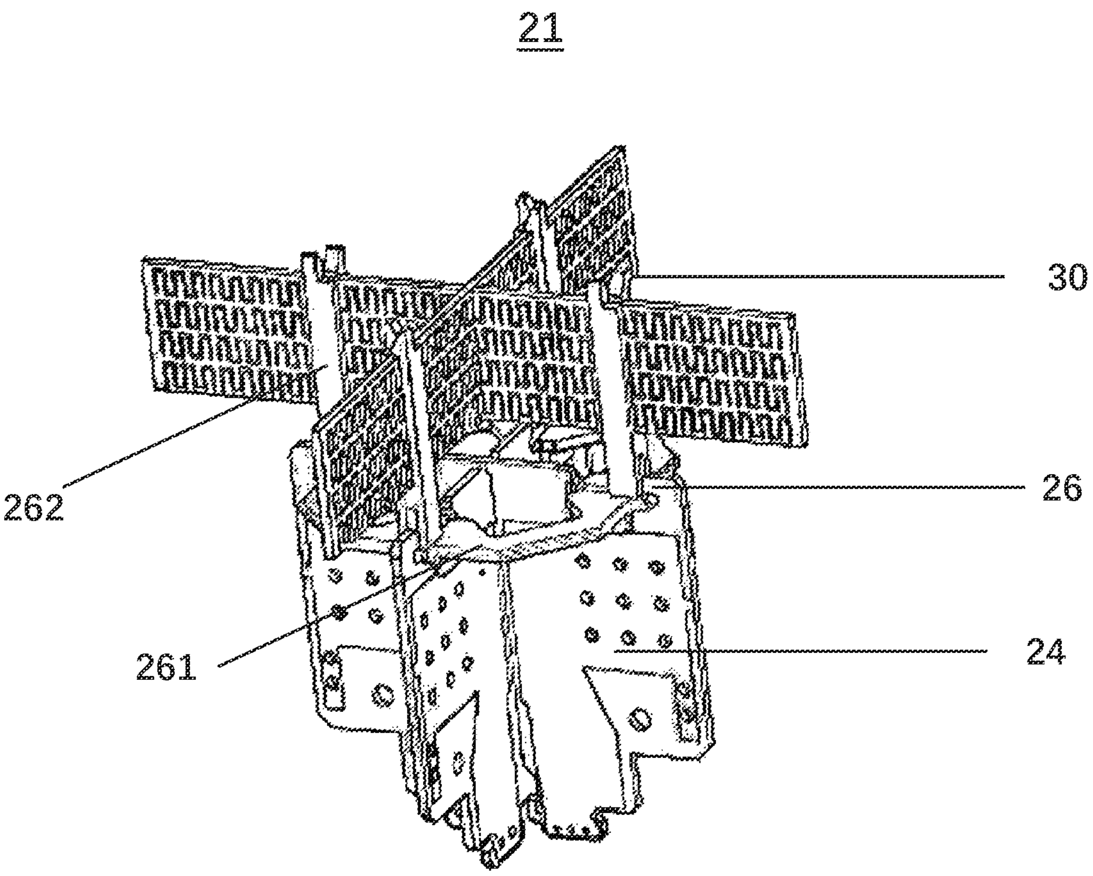
FIG. 5 is an exemplary assembly view of a metamaterial director of the radiating element in FIG. 4.

FIG. 5 is an exemplary assembly view of the metamaterial director 30 of the first radiating element 21. The first radiating element 21 may include a plastic support structure 26, and the metamaterial director 30 may be mounted in front of the radiator 24 by means of the plastic support structure 26. As shown in FIG. 5, the plastic support structure 26 may include a horizontal support ring 261 fixed on the radiator 24 and a plurality of vertical support arms 262 extending forwardly from the horizontal support ring 261 for securely supporting the metamaterial director 30 in front of the radiator 24. It should be understood that the design form of the plastic support structure 26 may be a variety of forms and is not limited to the design form of the illustrated embodiment.

In the embodiment of FIGS. 4-7B, the metamaterial director 30 is implemented using a pair of printed circuit boards. Each printed circuit board may include a dielectric substrate 301, and multiple metal pattern units 302 are printed on a first and/or second main surfaces of the dielectric substrate. Advantageously, multiple rows of periodically arranged metal pattern units 302 are printed on the first and second main surfaces of the printed circuit board. In the illustrated embodiment, the metal pattern unit 302 may be configured as a meandered trace segment.

It should be understood that the design form of the metal pattern on the printed circuit board director can be diverse and is not limited to the specific embodiment enumerated here. The tuning effect, such as the narrowing effect, i.e. the refractive index-frequency characteristic, of the metamaterial director 30 may be adjusted by changing the shape, number, and/or arrangement of the various metal pattern units 302 on the printed circuit boards. In some embodiments, the metamaterial director 30 may have a first refractive index greater than 1.1, 1.2, 1.3, 1.4 or even 1.5 within a first sub-band of the operating frequency band of the radiating element, to achieve different narrowing effects. In some embodiments, the metamaterial director 30 may have a second refractive index that is less than the first refractive index within a second sub-band of the operating frequency band of the radiating element, for example, a second refractive index that is less than 1.1, 1.2, 1.3, 1.4 or even 1.5. In some embodiments, the imaginary value of the impedance of the metamaterial director 30 may be substantially zero, that is, less than 0.1, 0.05 or 0.01, thereby preventing the metamaterial director 30 from having an undesirable negative effect on the return loss performance of the radiating element.

In other embodiments, the metamaterial director 30 may be implemented using stamped metal plates on which multiple metal pattern units 302 are formed. The stamped metal plates may be mounted in front of the radiator 24 by means of a medium support structure. It should be understood that the stamped metal plates may have the same design as discussed above with respect to the directors that are formed using printed circuit boards—unless contradictory—and hence can be applied to the stamped metal plate director and is not repeated here.

Figure 7A:
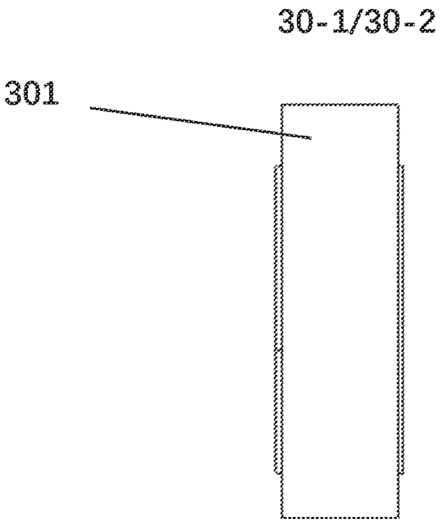
FIG. 7A is a side view of a metamaterial director of a radiating element according to some embodiments of the present disclosure.
Figure 7B:
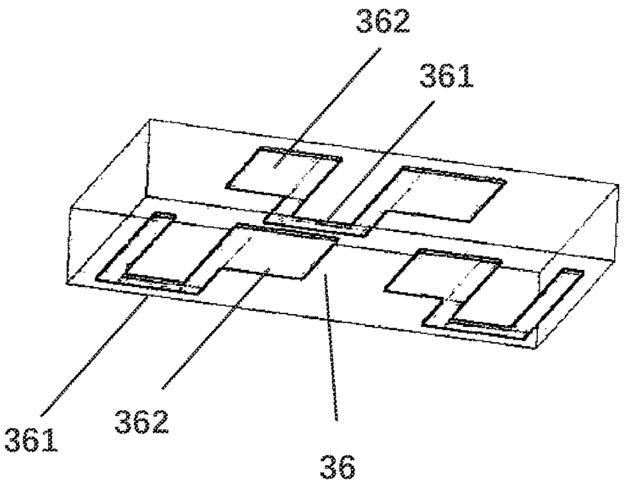
FIG. 7B is an exemplary perspective view of a metamaterial director of a radiating element according to some embodiments of the present disclosure.

Referring next to FIGS. 7A and 7B, an advantageous design solution for a metal pattern on a metamaterial director 30 of a radiating element according to some embodiments of the present disclosure is described. In the multiband antenna as shown in FIG. 1, the metamaterial director 30 for the first radiating element 21 may cause undesirable interference, such as a scattering effect, to an adjacent second radiating element 22. To minimize such interference, the metamaterial director 30 of the corresponding first radiating element 21 may be configured to be substantially invisible for the column 220 of second radiating elements. As shown in FIG. 7B, a resonant structure 36 may be formed on the metamaterial director 30, and the resonant structure 36 is configured to at least partially attenuate a current that may be otherwise induced on the metamaterial director 30 over at least a partial frequency range of the operating frequency band of the second radiating element 22, thereby reducing the scattering effect of the metamaterial director 30 on the second radiating element 22.

The resonant structure 36 may include an inductive section formed by a narrow section 361 and a capacitive section formed by a wide section 362. As shown in FIG. 7B, a first wide section 362 and a first narrow section 361 may be provided on a first main surface of the metamaterial director 30, a second wide section 362 and a second narrow section 361 may be provided on a second main surface of the metamaterial director 30, and the first wide section 362 and the second wide section 362 at least partially overlap. It should be understood that the periodically arranged metal pattern units 302 of the metamaterial director 30 may form multiple resonant structures 36 in order to achieve good filtering effects.

Figure 8:
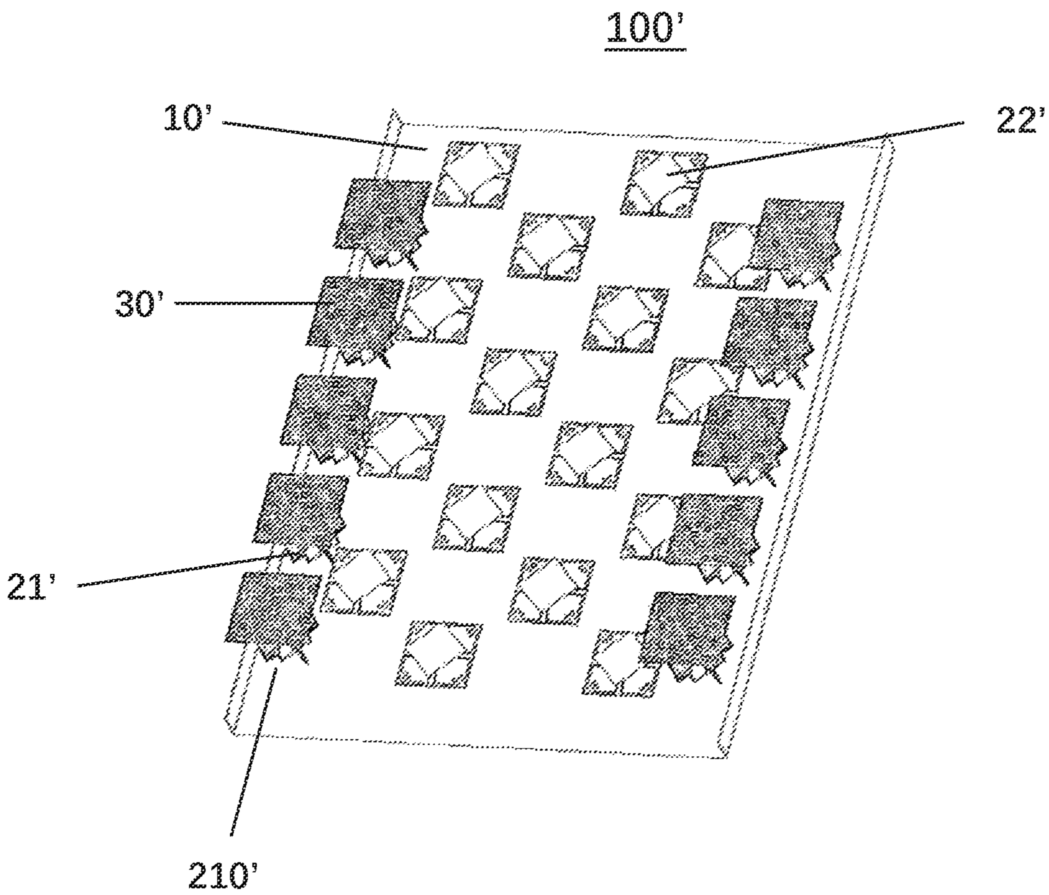
FIG. 8 is a schematic simplified perspective view of a base station antenna according to some other embodiments of the present disclosure, in which, the radome is removed.
Figure 9:
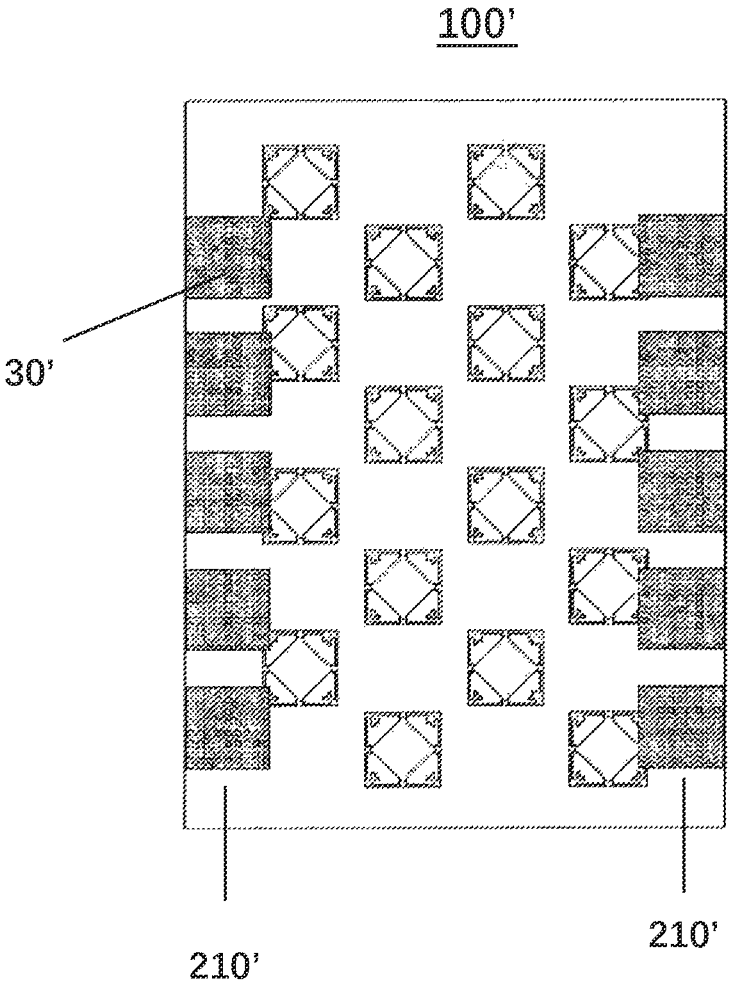
FIG. 9 is a schematic front view of the base station antenna in FIG. 8.
Figure 10:
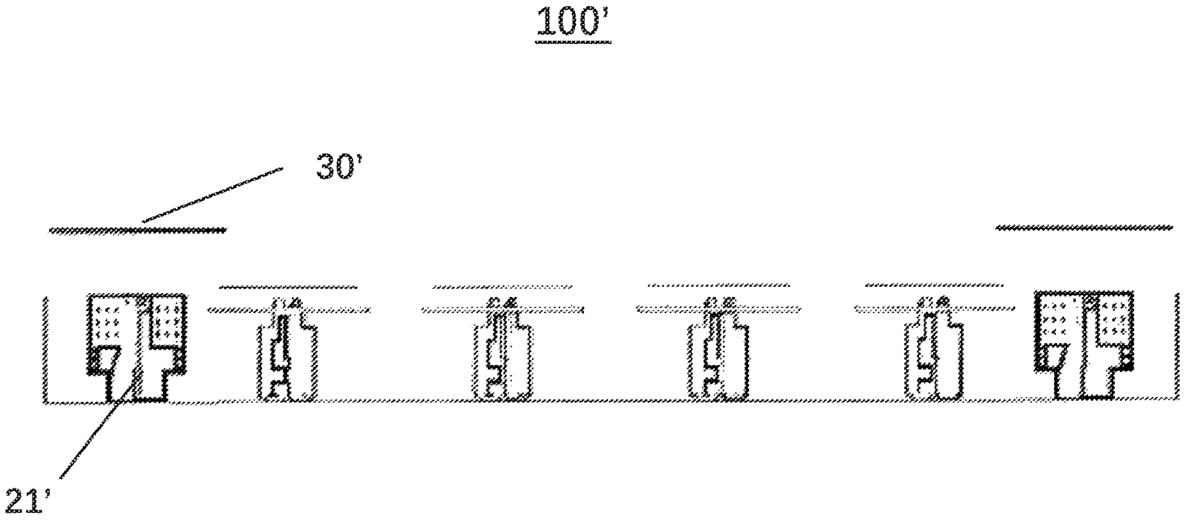
FIG. 10 is a schematic end view of the base station antenna in FIG. 8.

Next, referring to FIGS. 8-10, a base station antenna 100' according to some other embodiments of the present disclosure is introduced. FIG. 8 is a schematic simplified perspective view of the base station antenna 100', in which, the radome is removed. FIG. 9 is a schematic front view of the base station antenna 100' in FIG. 8. FIG. 10 is a schematic end view of the base station antenna 100' in FIG. 8. For brevity, only differences from the above-mentioned embodiments are described below with emphasis. It should be understood that the above description of the base station antenna 100, the radiating elements, and the metamaterial director 30—unless contradictory—may be applied to the embodiments of FIGS. 8-10, and is not repeated here.

As shown in FIGS. 8 to 10, a first radiating element 21' may be provided with a corresponding metamaterial director 30'. The corresponding metamaterial director 30' (which has a main surface of a metal pattern) may extend substantially horizontally, for example substantially parallel to a reflecting plate 10'. It should be understood that in other possible embodiments, the metamaterial director 30' may also have an angle of inclination with respect to the reflecting plate 10', for example, an angle of inclination of less than 30 degrees, 15 degrees, 5 degrees. The metamaterial director 30' may be configured to adjust the azimuth width and/or the elevation width of the radiation pattern of the first radiating element 21'. In other words, a column 210' of first radiating elements may be provided with a corresponding column of metamaterial directors, which may be configured to adjust the azimuth width and/or the elevation width of the radiation pattern of a first beam generated by the column 210' of first radiating elements. In some cases, the column of metamaterial directors may be configured to stabilize the azimuth width and/or the elevation width of the radiation pattern within the operating frequency band of the first radiating element 21' within a predetermined range.

As shown in FIGS. 8-10, a radiator may include a first radiator for a first polarized radio frequency signal and a second radiator for a second polarized radio frequency signal. The first radiator and the second radiator may be crossed into a cross radiator.

The metamaterial director 30' may be implemented as a horizontally extending printed circuit board director or a stamped metal plate director. The metamaterial director 30' may be configured to not only adjust, for example, the azimuth width and/or the elevation width of the radiation pattern of the first radiator, but also adjust, for example, the azimuth width and/or the elevation width of the radiation pattern of the second radiator.

Multiple metal pattern units may be provided on the first main surface and/or the second main surface of the metamaterial director 30'. Advantageously, multiple rows of periodically arranged metal pattern units may be provided on the first main surface of the metamaterial director 30' facing the radiating element and the second main surface thereof facing away from the radiating element.

Additionally or alternatively, a resonant structure (see FIGS. 7A and 7B) may be formed on the metamaterial director 30', and the resonant structure is configured to at least partially attenuate a current that may be otherwise induced on the metamaterial director 30' over at least a partial frequency range of the operating frequency band of the second radiating element 22', thereby reducing the scattering effect of the metamaterial director 30' on the second radiating element 22'. The resonant structure may be constructed as described with respect to FIGS. 7A and 7B, which is not repeated here.

Figure 11:
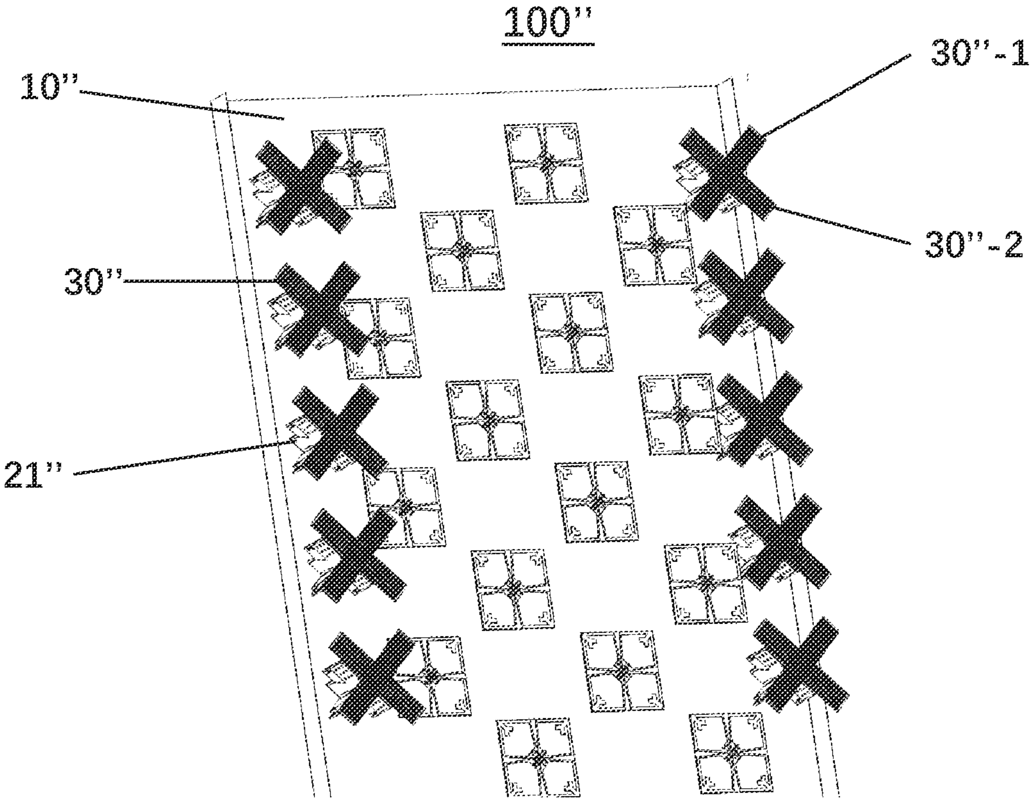
FIG. 11 is a schematic simplified perspective view of a base station antenna according to another embodiment of the present disclosure, in which, the radome is removed.

Next, referring to FIG. 11, a base station antenna 100" according to another embodiment of the present disclosure is introduced. For brevity, only differences from the above-mentioned embodiments are described below with emphasis. It should be understood that the above description of the base station antenna, the radiating elements, and the metamaterial director—unless contradictory—may be applied to the embodiments of FIG. 11, and is not repeated here.

As shown in FIG. 11, a first radiating element 21" may be provided with a corresponding metamaterial director 30". The corresponding metamaterial director 30" is configured as a cross metamaterial director formed by a first metamaterial director 30"-1 and a second metamaterial director 30"-2. The first metamaterial director 30"-1 and the second metamaterial director 30"-2 (each has a main surface of a metal pattern) may extend substantially horizontally, for example substantially parallel to a reflecting plate 10". It should be understood that in other possible embodiments, the first metamaterial director 30"-1 and the second metamaterial director 30"-2 may each have an angle of inclination with respect to the reflecting plate 10", for example, an angle of inclination of less than 30 degrees, 15 degrees, 5 degrees. In some embodiments, the cross metamaterial director 30" may be formed using two separate PCB mounted on each other. In some embodiments, the cross metamaterial director 30" may be formed using a single cross-shaped PCB with a plated through hole crossover.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

That which is claimed is:

1. A radiating element, comprising:

a radiator, configured to emit a first electromagnetic radiation within a first operating frequency band; and a metamaterial director mounted in front of the radiator, wherein the metamaterial director is configured to adjust a radiation pattern of the first electromagnetic radiation, wherein the first operating frequency band of the radiator comprises a first sub-band and a second sub-band different from the first sub-band, so that the radiator is configured to emit not only the first electromagnetic radiation within the first sub-band, but also a second electromagnetic radiation within the second sub-band, and wherein the refractive index of the metamaterial director in the first sub-band is greater than the refractive index of the metamaterial director in the second sub-band, so that the narrowing effect of the metamaterial director for the first electromagnetic radiation is greater than the narrowing effect for the second electromagnetic radiation.

2. The radiating element according to claim 1, wherein the metamaterial director comprises at least one row of periodically arranged metal pattern units.

3. The radiating element according to claim 2, wherein the radiating element extends forwardly from a reflector, and a main surface of the metamaterial director having multiple metal pattern units extends substantially parallel to the reflector.

4. The radiating element according to claim 1, wherein the first sub-band comprises at least a portion of the 4.5-5 GHz frequency band, and the second sub-band comprises at least a portion of the 3.5-4.5 GHz frequency band.

5. The radiating element according to claim 3, wherein a resonant structure is formed on the metamaterial director, and a second frequency band outside the first operating frequency band of the radiator is within a stop band of the resonant structure, so that the metamaterial director is configured to be substantially invisible to for an electromagnetic radiation within the second frequency band.

6. A base station antenna, comprising:

a reflecting plate; and a column of first radiating elements mounted in front of the reflecting plate, configured to operate within the first operating frequency band, wherein at least a portion of the first radiating elements in the column of first radiating elements are each configured as the radiating element according to claim 1.

7. The base station antenna according to claim 6, wherein a metamaterial director of a corresponding first radiating element is basically perpendicular to the reflecting plate.

8. The base station antenna according to claim 6, wherein a metamaterial director of a corresponding first radiating element is configured to be substantially parallel to the reflecting plate.

9. The base station antenna according to claim 6, wherein the base station antenna further comprises a column of second radiating elements mounted in front of the reflecting plate, configured to operate in a second operating frequency band, and the second operating frequency band is different from the first operating frequency band.

10. The base station antenna according to claim 9, wherein a metamaterial director of a corresponding first radiating element is configured to be substantially invisible for the column of second radiating elements.

11. The radiating element according to claim 1, wherein the metamaterial director comprises a resonant structure that comprises an inductive section formed from a first narrow section and a capacitive section formed from a first wide section.

12. The radiating element according to claim 11, wherein a first main surface of the metamaterial director includes the first wide section and the first narrow section, a second main surface of the metamaterial director has a second wide section and a second narrow section, and the first wide section and the second wide section at least partially overlap.

13. A radiating element, comprising:

a first radiator, configured to operate within a first operating frequency band; and a first metamaterial director mounted in front of the first radiator, wherein the first metamaterial director is configured to adjust a radiation pattern of electromagnetic radiation emitted by the first radiator;

a second radiator configured to operate within the first operating frequency band, the second radiator in a first cross arrangement with the first radiator; and a second metamaterial director mounted in front of the second radiator, wherein the second metamaterial director is configured to adjust a radiation pattern of electromagnetic radiation emitted by the second radiator, where the second metamaterial director is in a second cross arrangement with the first metamaterial director.

14. The radiating element according to claim 13, wherein the first metamaterial director has a first engagement slot, the second metamaterial director has a second engagement slot, and the first and second metamaterial directors are cross-engaged with each other via the first and second engagement slots.

15. The radiating element according to claim 13, wherein the first cross arrangement and the second cross arrangement substantially overlap in the forward direction.

16. A radiating element, comprising:

a radiator, configured to emit a first electromagnetic radiation within a first operating frequency band; and a frequency selective director having a sub wavelength periodic structure mounted adjacent the radiator, the frequency selective director configured to adjust a radiation pattern of the first electromagnetic radiation within a first sub-band of the first operating frequency band while substantially not adjusting a radiation pattern of the first electromagnetic radiation within a second sub-band of the first operating frequency band.

17. The radiating element according to claim 16, wherein the frequency selective director narrowed the average azimuth beam width by at least 3 degrees in the first sub-band while narrowing the average azimuth beam width by less than 2 degrees in the second sub-band.

18. The radiating element according to claim 16, wherein the radiating element comprises:

a first radiator and a second radiator in cross arrangement with the first radiator; and a first frequency selective director and a second frequency selective director in cross arrangement with the first frequency selective director.

19. The radiating element according to claim 18, wherein the first radiator and the second radiator form a first cross pattern, the first frequency selective director and the second frequency selective director form a second cross pattern, and the first cross pattern and the second cross pattern substantially overlap in the forward direction.

* * * * *